United States Patent
Faye et al.

(10) Patent No.: US 10,151,653 B2
(45) Date of Patent: Dec. 11, 2018

(54) SYSTEM FOR REPRODUCING A DRY FRICTION TORQUE APPLIED TO AN ACTUATOR OF A VALVE LOCATED IN A HYDRAULIC LINE OF AN ENGINE OF A SPACECRAFT INCLUDING AN ELECTRICAL ACTUATOR CONTROLLING ORTHOGONAL FORCES OF PLATES ON A DISC TO APPLY RESISTIVE TORQUE TO A SHAFT OF THE ACTUATOR

(71) Applicant: SNECMA, Paris (FR)

(72) Inventors: Olivier Faye, Menilles (FR); Anthony Caron, Rouen (FR); Philippe Nomerange, Poissy (FR); Serge Legonidec, Vernon (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 358 days.

(21) Appl. No.: 14/843,161

(22) Filed: Sep. 2, 2015

(65) Prior Publication Data

US 2016/0061675 A1 Mar. 3, 2016

(30) Foreign Application Priority Data

Sep. 2, 2014 (FR) ...................................... 14 58185

(51) Int. Cl.
*G01L 5/00* (2006.01)
*G01L 3/18* (2006.01)
(Continued)

(52) U.S. Cl.
CPC .............. *G01L 3/16* (2013.01); *F16D 55/225* (2013.01); *F16D 65/18* (2013.01); *G01L 3/18* (2013.01);
(Continued)

(58) Field of Classification Search
CPC .. G01L 3/16; G01L 3/18; G01L 3/242; G01M 15/044; F16D 65/128;
(Continued)

(56) References Cited

U.S. PATENT DOCUMENTS

| 6,182,516 B1 | 2/2001 | Kowalczyk |
| 2002/0125094 A1* | 9/2002 | Zimmermann ......... F16H 61/28 |
| | | 192/3.58 |

FOREIGN PATENT DOCUMENTS

DE 101 37 880 A1 5/2002
FR 379 479 11/1907

OTHER PUBLICATIONS

French Preliminary Search Report dated Jul. 7, 2015 in French Application 14 58185, filed on Sep. 2, 2014 (with English Translation of Category of Cited Documents).

* cited by examiner

Primary Examiner — Harshad R Patel
Assistant Examiner — Brandi N Hopkins
(74) *Attorney, Agent, or Firm* — Oblon, McClelland, Maier & Neustadt, L.L.P.

(57) ABSTRACT

A system for reproducing a dry friction torque applied to an actuator on a valve of a hydraulic line including a disc coupled to a power transmission shaft; a disc brake including a caliper mounted on a frame and plates adapted to be put into contact with the disc; and an electric actuator configured to control the force of application of the plates onto the disc so as to apply a controlled resistive torque to the power transmission shaft, is provided.

7 Claims, 1 Drawing Sheet

(51) Int. Cl.
  *G01M 13/00* (2006.01)
  *G01L 3/16* (2006.01)
  *F16D 55/225* (2006.01)
  *F16D 65/18* (2006.01)
  *F16D 55/00* (2006.01)
  *F16D 121/28* (2012.01)

(52) U.S. Cl.
  CPC ............ *G01L 5/0042* (2013.01); *G01M 13/00* (2013.01); *F16D 2055/0016* (2013.01); *F16D 2121/28* (2013.01)

(58) Field of Classification Search
  CPC ......... F16D 2065/781; F16D 2066/005; F16D 65/853; F16D 2065/784
  See application file for complete search history.

SYSTEM FOR REPRODUCING A DRY FRICTION TORQUE APPLIED TO AN ACTUATOR OF A VALVE LOCATED IN A HYDRAULIC LINE OF AN ENGINE OF A SPACECRAFT INCLUDING AN ELECTRICAL ACTUATOR CONTROLLING ORTHOGONAL FORCES OF PLATES ON A DISC TO APPLY RESISTIVE TORQUE TO A SHAFT OF THE ACTUATOR

GENERAL TECHNICAL FIELD

The present invention relates to the field of test beds for simulating the real operating conditions of rocket engine control elements.

PRIOR ART

Within the scope of the design of an electric actuator for a valve located in a hydraulic line of a rocket engine, and its electronic control, it is necessary to accomplish simulations reproducing the real operating conditions of the various members of this actuation system so as to validate its behavior in operation.

So as to limit the cost of tests, it is attempted to carry out tests on the actuator of the valve taken in isolation, without integrating it into a complete system, because such an integration into a complete system is very difficult to put into practice and would not allow the entire range of the qualification field to be covered.

Simulations must therefore reproduce the different loads applied to the rotary power transmission shaft of the valve actuator, particularly the resultant of forces applied to their coupling devices with the movable elements of the valve, particularly the plug. This resultant comprises principally 2 components:

- the hydrodynamic loads, assumed to be dependent on the position of the plug and the thermodynamic conditions of the fluid stream depending on the operation of the rocket motor, and
- the dry friction loads generated on the plug or the driveline of the flow portion,
- the viscous friction forces (depending on the speed of actuation) connected with the flow portion, The hydrodynamic loads are typically reproduced by means of a motor which applies a force simulating these loads.

On the other hand, the dry and viscous friction that the load to which a valve actuator would actually have been connected to are particularly complex to reproduce. Indeed, this friction acts like a purely resistive torque, and therefore has a nonlinear discontinuous behavior depending on the sign of the speed which is very difficult to reproduce.

The present invention thus aims to propose a system allowing such dry friction to be reproduced, in a manner that is reliable and simple to implement by replacing the valve body and its different elements contributing to the real resistive elements.

PRESENTATION OF THE INVENTION

To this end, the present invention proposes a system for reproducing a dry friction torque applied to an actuator, for example on an actuator of a hydraulic line valve of a spacecraft engine, including:

a disc coupled to a power transmission shaft,
a disc brake including a caliper mounted on a frame and plates adapted to be put into contact with the disc,
an electric actuator configured to control the force of application of the plates to the disc so as to apply a controlled resistive torque to the power transmission shaft.

The electric actuator is for example a piezoelectric actuator.

The electric actuator is typically configured so as to generate a displacement and/or a force proportional to a control voltage or current which is applied to it.

According to a particular embodiment, the disc is movable in rotation about an axis, the system including a device for measuring forces tangent to the rotation of the disc which the caliper transmits to the frame.

The caliper is then typically mounted on the frame, and said device for measuring tangent forces includes strain gauges measuring the strains applied to the fixing of the caliper on the frame.

As a variant, the caliper is mounted on the frame so as to be movable about an axis of rotation, for example so as to obtain a sufficient degree of freedom so that the device for measuring forces are affected, and said device for measuring tangent forces includes instruments for measuring the angular displacement of the caliper about the axis of rotation.

The invention also relates to a method for reproducing a dry friction torque applied to the power transmission shaft of an actuator wherein, by means of a disc brake, a radial force is applied to the plates rubbing against the disc, thus generating a resisting torque on the power transmission shaft of the actuator, the disc brake being controlled by means of an electric actuator.

The disc is typically movable in rotation about an axis, and the forces tangent to the rotation of the disc, which a caliper of the disc brake transmits to the frame, are measured.

According to one particular embodiment, a closed-loop control of the braking force is accomplished by acting on the electric actuator based on measurement of the force applied to the caliper of the disc brake. This measurement on the caliper makes it possible to have direct measurement of the braking force which is not made noisy by the dynamic phenomena related to the device for braking and for reproducing the load, as in conventional measurement by a torquemeter on the shaft.

As a variant, a closed-loop control is accomplished using the braking force by acting on the electric actuator based on filtered or estimated information on the force applied to a caliper of the disc brake.

PRESENTATION OF THE FIGURES

Other features, aims and advantages of the invention will appear from the description hereafter, which is purely illustrative and not limiting, and which must be read with reference to appended drawings, wherein.

In all the figures, the common elements are designated by identical numeric references.

DETAILED DESCRIPTION

Figure 1:
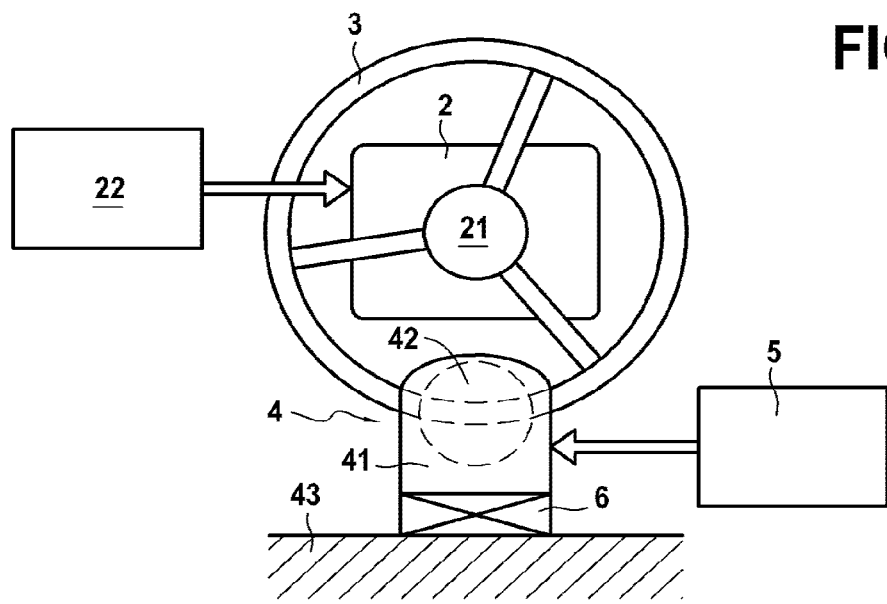
FIG. 1 shows an example of a system according to one aspect of the invention.
Figure 2:
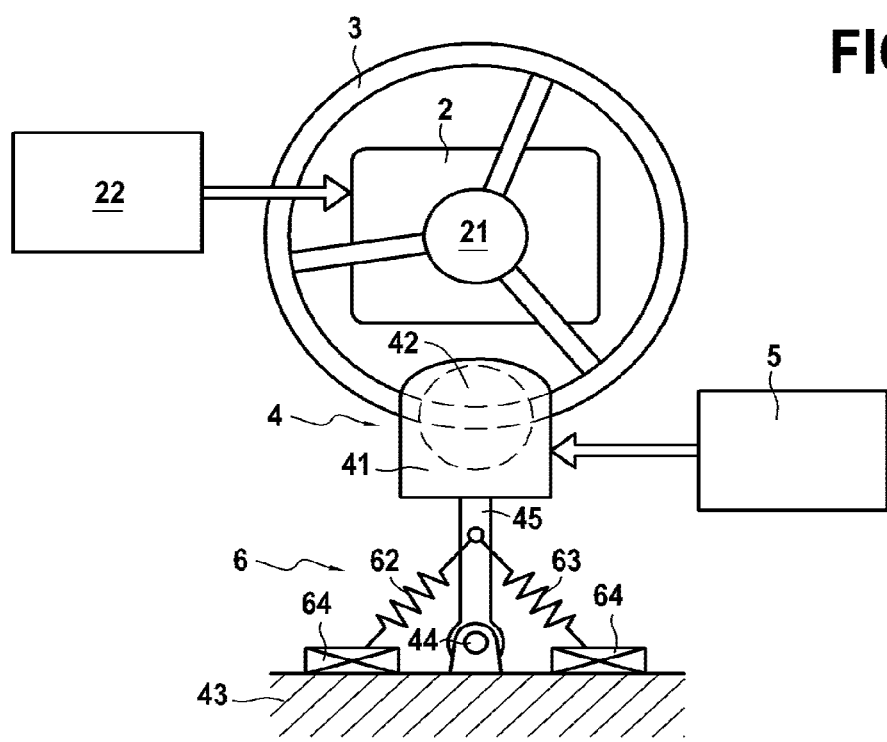
FIG. 2 shows another embodiment of the system according to one aspect of the invention.

FIG. 1 shows an example of a system according to one aspect of the invention; FIG. 2 shows a variant of this system.

The system shown includes an actuator 2, including a rotary power transmission shaft 21 coupled to a disc 3. The actuator 2 is typically controlled by means of a controller 22 shown schematically in the figures.

The disc 3 can be a full disc or be hollowed at its center. In the embodiment shown in the figures, the disc 3 is hollowed at its center and has the general shape of a flywheel.

A disc brake 4, including a caliper 41 and plates 42, is mounted on a frame 43 via its caliper 41, so as to be able to selectively apply the plates 42 against the disc 3 with a given radial mechanical force, so that the plates 42 rub against the disc 3 and thus exert a resistive torque opposing the angular displacement of the disc 3 and therefore the angular displacement of the power transmission shaft 21 of the actuator 2.

The friction couple developed by the system depending on the mechanical force applied to the plates 42 is well known, and can be calculated by means of the following relation: $C_f = f \times K_{geo} \times F_{plates}$ Wherein:

$C_f$ is the friction couple, applied by the disc brake 4 and the disc 3 to the power transmission shaft 21 of the actuator 2;

f is the friction coefficient between the plates 42 and the disc 3;

$K_{geo}$ is a constant determined based on the geometry of the disc 3 and the plates 42;

$F_{plates}$ is the radial mechanical force applied by the plates 42 on the disc 3.

It is also possible to determine the radial mechanical force to be applied to the plates 42 to apply a given friction torque to the disc 3.

The system also includes an actuator 5, configured to control the disc brake 4 and therefore to control the force applied by the plates 42 on the disc 3 for the purpose of controlling the resisting torque on the power transmission shaft 21 on the actuator 2, The actuator 5 is typically an electrical type actuator, for example a piezoelectric type actuator advantageously configured to generate a displacement and/or force of the plates 42 toward the disc 3 proportional to a control voltage applied to the actuator 5.

The actuator 5 is for example a mechanically amplified pantographic type piezoelectric actuator.

The actuator 5 can be example be an actuator as marketed under the designation APA™ 500XL by the CEDRAT TECHNOLOGIES company.

The actuator 5 typically includes a feedback loop for the command that it delivers.

The control can be closed loop, or open loop on which is then defined a linear law applicable to a limited operating field.

The input values of the actuator 5 are then typically:

The resisting torque exerted on the power transmission shaft 21 of the actuator 2, for which structures allowing its determination are presented hereafter;

The value of the dry friction resisting torque that it is desired to reproduce.

The angular displacement speed of the disc 3 and therefore of the power transmission shaft 21 of the actuator 2 can also be taken into account, for example in a discontinuous manner, so as to neutralize control when the angular speed is equal to or nearly zero.

These input values are processed by the actuator 5, typically by means of a calculator coupled to or integrated with the actuator 5 so as to deliver an output command adapted to exert the radial force of the plates 42 on the disc 3.

The calculator also accomplishes a feedback function by providing for maintaining the desired force despite possible variations in the system, for example friction characteristics between the disc 3 and the plates 42 which are capable of varying with time, particularly in the case of an increase in temperature.

The displacement speed of the disc 3 is used in a slot type control function of the electric actuator, which allows maintenance of a radial mechanical force of the plates 42 on the disc 3 when the displacement speed is zero or substantially zero, and inhibits the effect of speed on control as long as a threshold speed value is attained.

In order to measure the resistive couple applied by the system, the system according to the invention typically includes a device for measuring the forces tangent to the rotation of the transmission shaft 21 of the actuator 2 and the disc 3, which the caliper 41 transmits to the frame 43.

In the embodiment shown in FIG. 1, the caliper 41 is fixedly mounted to the frame 43, and the device 6 for measuring the tangent forces includes gauges for measuring forces applied to the fixing of the caliper 41 to the frame 43.

This measurement of forces applied to the fixing of the caliper 41 to the frame 43 makes it possible to directly deduce by the action/reaction principle the resisting torque applied to the power transmission shaft 21 of the actuator 2, independently of the friction coefficient between the plates 42 and the disc 3 and the operating conditions. This measurement of force makes it possible to dispense with the effects of inertia of the disc 3 which perturb direct measurement by torquemeter on an axis of rotation as performed ordinarily.

The use of strain gauges with a high bandwidth, typically greater than 10 kHz, coupled to a high bandwidth of the actuator 5, typically greater than 100 kHz when this is a piezoelectric actuator, makes it possible to contemplate a simple and effective control of the closed loop system.

Absent a signal by the measurement device 6 of the tangent forces, for example when the system is stopped, maintaining the braking force exerted by the disc brake 4 can be accomplished according to the last braking command applied when the system was not stopped, or according to a predetermined value.

In the embodiment shown in FIG. 2, the caliper 41 is mounted on the frame 43 through a support 45 so as to be movable about an axis of rotation 44, typically combined with the axis of rotation of the disc 3, or for example parallel to the axis of rotation of the power transmission shaft 21 of the actuator 2 and of the disc 3.

The device 6 for measuring tangent forces includes two identical springs 62 and 63, mounted in opposition, so that each opposes the rotation of the power transmission shaft 21 of the actuator 2 and of the disc 3 about its axis of rotation 44 in a distinct direction. Sensors 64 then measure the angular displacement of the power transmission shaft 21 of the actuator 2 and of the disc 3 about its axis of rotation 44, which thus allows, by coupling the angular displacement measured with the stiffness values of the springs 62 and 63, determination of the resisting torque on the power transmission shaft 21 of the actuator 2.

The system proposed thus makes it possible to reproduce simply and reliably the dry friction torque applied to a valve actuator, for example the actuator of a hydraulic valve which can in particular be integrated into a spacecraft engine, particularly during maneuvers or low-amplitude control about a given position without requiring the integration of the valve into a complete system.

The proposed system can in particular be used for modeling dry friction on linear actuators, or more generally for all types of actuators of which the motor torque margins and resisting torque are relatively weak, and thus pose a risk in position stability in the event of dry friction.

The invention claimed is:

1. A system for reproducing a dry friction torque applied to a valve actuator to be tested, comprising:
    a disc coupled to a power transmission shaft of the valve actuator to be tested;
    a disc brake including a caliper mounted on a frame and plates adapted to be put into contact with the disc so as to apply an orthogonal force to the disc; and
    an electrical actuator configured to control a force of application of the plates on the disc so as to apply a controlled resistive torque to the power transmission shaft of the valve actuator to be tested,
    wherein the disc is movable in rotation about an axis, the system including a device for measuring forces tangent to the rotation of the disc that the caliper transmits to the frame,
    wherein the caliper is mounted on the frame, so as to be movable about an axis of rotation, and said device for measuring tangent forces includes instruments for measuring an angular displacement of the caliper about the axis of rotation,
    wherein said device for measuring tangent forces includes two identical springs, mounted in opposition, so that each spring opposes the rotation of the power transmission shaft of the valve actuator to be tested and of the disc about the axis of rotation in a distinct direction, the system further including sensors adapted to measure an angular displacement of the power transmission shaft of the valve actuator to be tested and of the disc about its axis of rotation so as to determine the resistive torque on the power transmission shaft of the valve actuator to be tested,
    wherein a first end of each spring is mounted on a support on which the caliper is mounted to the frame, the support being movable about the axis of rotation, and a second end of each spring is mounted to one of the sensors, and
    wherein the resistive torque on the power transmission shaft of the valve actuator to be tested is determined based on the angular displacement of the power transmission shaft of the valve actuator to be tested and of the disc about its axis of rotation, and stiffness values of the two identical springs.

2. The system according to claim 1, wherein the electrical actuator is a piezoelectric actuator.

3. The system according to claim 2, wherein said electrical actuator is configured so as to generate at least one of a displacement and a force proportional to a control voltage or a current which is applied to the electrical actuator.

4. The system according to claim 1, wherein the caliper is fixedly mounted to the frame, and said device for measuring tangent forces includes strain gauges measuring strains applied to a fixing of the caliper on the frame.

5. A method for reproducing a dry friction torque applied to a power transmission shaft of a valve actuator to be tested, the method comprising:
    applying an orthogonal force to plates of a disc brake rubbing on a disc to generate a resisting torque on the power transmission shaft of the valve actuator to be tested, the power transmission shaft of the valve actuator to be tested being coupled to the disc,
    wherein an electrical actuator controls a force of application of the plates on the disc,
    wherein the disc is movable in rotation about an axis,
    wherein forces tangent to the rotation of the disc are measured, which a caliper bearing the plates of the disc brake transmits to a frame,
    wherein the caliper is mounted on the frame, so as to be movable about an axis of rotation,
    wherein an angular displacement of the caliper about the axis of rotation is measured using a device including two identical springs, mounted in opposition, so that each spring opposes the rotation of the power transmission shaft of the valve actuator to be tested and of the disc about the axis of rotation in a distinct direction,
    wherein an angular displacement of the power transmission shaft of the valve actuator to be tested and of the disc about its axis of rotation is measured using sensors so as to determine the resistive torque on the power transmission shaft of the valve actuator to be tested,
    wherein a first end of each spring is mounted on a support on which the caliper is mounted to the frame, the support being movable about the axis of rotation, and a second end of each spring is mounted to one of the sensors, and
    wherein the resistive torque on the power transmission shaft of the valve actuator to be tested is determined based on the angular displacement of the power transmission shaft of the valve actuator to be tested and of the disc about its axis of rotation, and stiffness values of the two identical springs.

6. The method according to claim 5, wherein closed loop control of the braking force is accomplished by acting on the electrical actuator based on measurement of the force applied to the disc through the plates accomplished to the caliper of the disc brake.

7. The method according to claim 5, wherein open loop control of the braking force is accomplished by acting on the electrical actuator based on filtered or estimated information on the force applied to the caliper of the disc brake.

* * * * *

UNITED STATES PATENT AND TRADEMARK OFFICE
CERTIFICATE OF CORRECTION

PATENT NO. : 10,151,653 B2
APPLICATION NO. : 14/843161
DATED : December 11, 2018
INVENTOR(S) : Olivier Faye et al.

Page 1 of 1

It is certified that error appears in the above-identified patent and that said Letters Patent is hereby corrected as shown below:

On the Title Page

Item (71) should read:
-- (71) Applicant: SAFRAN AIRCRAFT ENGINES, Paris (FR) --

Signed and Sealed this
First Day of October, 2019

Andrei Iancu
*Director of the United States Patent and Trademark Office*